United States Patent [19]

Januschkowetz

[11] Patent Number: 4,581,049
[45] Date of Patent: Apr. 8, 1986

[54] SOLID ABSORBER APPARATUS FOR A CYCLIC ABSORPTION PROCESS

[75] Inventor: Gerhard Januschkowetz, Munich, Fed. Rep. of Germany

[73] Assignee: Schiedel GmbH & Co., Munich, Fed. Rep. of Germany

[21] Appl. No.: 628,654

[22] Filed: Jul. 6, 1984

[30] Foreign Application Priority Data

Jul. 8, 1983 [DE] Fed. Rep. of Germany ....... 3324745
Jun. 29, 1984 [DE] Fed. Rep. of Germany ....... 3424116

[51] Int. Cl.$^4$ .............................................. F01D 53/04
[52] U.S. Cl. ........................................ 55/208; 55/269;
55/389; 62/119; 62/478; 62/480
[58] Field of Search .................. 55/208, 269, 389, 75;
62/112, 274, 235.1, 480, 119, 478, 479

[56] References Cited

U.S. PATENT DOCUMENTS

| 2,253,907 | 8/1941 | Levine | 62/5 |
| 2,323,902 | 7/1943 | af Kloen | 62/480 |
| 2,326,130 | 8/1943 | Kleen | 62/179 |
| 3,264,803 | 8/1966 | Read | 55/208 |
| 3,296,773 | 1/1967 | Hemstreet | 55/389 X |
| 3,335,550 | 8/1967 | Stern | 55/208 |
| 4,034,569 | 7/1977 | Tchernev | 62/2 |
| 4,147,523 | 4/1979 | Izumo | 55/208 |
| 4,377,398 | 3/1983 | Bennett | 55/208 |

FOREIGN PATENT DOCUMENTS

| 61191 | 9/1982 | European Pat. Off. . |
| 64562 | 11/1982 | European Pat. Off. . |
| 363826 | 11/1922 | Fed. Rep. of Germany . |
| 554766 | 7/1932 | Fed. Rep. of Germany . |
| 585880 | 10/1933 | Fed. Rep. of Germany . |
| 612169 | 4/1935 | Fed. Rep. of Germany . |
| 623182 | 12/1935 | Fed. Rep. of Germany . |
| 814158 | 10/1951 | Fed. Rep. of Germany . |
| 3016290 | 11/1983 | Fed. Rep. of Germany . |
| 776919 | 2/1935 | France . |
| 923016 | 6/1947 | France . |
| 1018022 | 12/1952 | France . |
| 2455713 | 11/1980 | France . |
| 114978 | 2/1925 | Switzerland . |
| 2010468 | 6/1979 | United Kingdom . |

OTHER PUBLICATIONS

R. Plank/Kuprianoff, "Die Kältemaschine", 2nd Edition (1960), pp. 351–359.

*Primary Examiner*—Charles Hart
*Attorney, Agent, or Firm*—Spencer & Frank

[57] ABSTRACT

Solid absorber apparatus for a discontinuously operable, cyclic absorption process comprising a housing; a solid absorber material provided in a plurality of juxtaposed chamber-like zones within the housing, the zones each having, in transverse cross-section, four sides which extend longitudinally within the housing, heat exchange means disposed along at least a portion of each of at least two but less than four sides of each of the zones whereby the zones are at least partially defined and separated from one another, and extending longitudinally within the housing, and adapted to carry alternatingly cooling and heating heat exchange medium so that at least a major portion of the heat flow between the absorber material and the respective heat exchange medium takes place across the sides of each of the zones; and a single vapor region defined within and extending longitudinally within the housing, being chargeable with a coolant vapor, being alternatively connectable with a condensor and an evaporator, and communicating jointly with the absorber material along the remaining side or sides of each of the zones, which are open, so that the absorption and desorption of a given portion of coolant vapor takes place along the same side and through the same absorber material, the single vapor region thereby alternatingly serving as an absorber vapor region and a desorber vapor region, wherein the absorber material, heat exchange means, and single vapor region are longitudinally coextensive, so that the capacity of the apparatus may be increased by longitudinal and transverse extension thereof.

44 Claims, 12 Drawing Figures

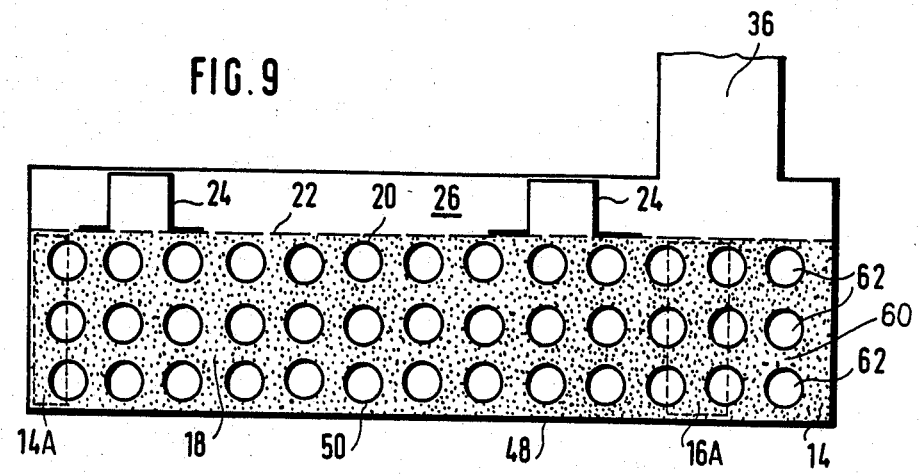
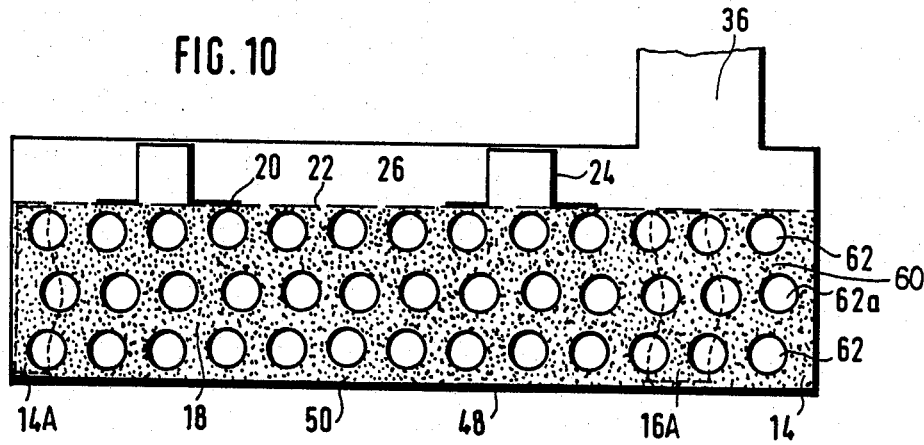

SOLID ABSORBER APPARATUS FOR A CYCLIC ABSORPTION PROCESS

BACKGROUND OF THE INVENTION

1. Field of the Invention

The invention relates to a solid absorber apparatus for a cyclic absorption process, and more particularly to a solid absorber apparatus having a single vapor region so that absorption and desorption of a given portion of coolant vapor takes palce across the same surface of the solid absorber material.

2. Discussion of the Art

In a cyclic absorption process, a coolant in vapor form is fed to the absorber material serving as the operating means in an absorber and is there absorbed or adsorbed, releasing absorption or adsorption heat. This reaction heat is removed by means of a cooling heat exchange medium. The absorber material can be regenerated by adding heat by means of a heating heat exchange medium. During the regeneration process, the coolant is expelled, liquefied in a connected condenser and fed under reduced pressure to an evaporator from where the coolant can be returned, after evaporation, to the regenerated absorber in the cyclic process. Such a cyclic process can be utilized in various ways. The best known way is its use as an absorption heat pump, as an absorption refrigeration machine or as a heat transformer.

Such a cyclic absorption process can be operated continuously with liquid absorber materials or discontinuously, particularly periodically, with solid absorber materials. The invention relates to the latter case. Modern-day pairings of solid absorber and coolant are, for example, zeolite and water or ammonia. The solid absorber according to the invention is intended, in particular, for use with such pairings. Zeolites and comparable solid absorbers are distinguished in that, during the absorption process (hereinafter, the term absorption is intended to always include adsorption as well) and during the desorption process, they retain their geometric structure, particularly their granular or sausage shape and will not swell even during the absorption of coolant. The invention relates particularly also to solid absorbers operating with constant volume solid absorber materials.

In principle, there are two structural types of solid absorbers. In the first structural type, the coolant vapor is fed to the solid absorber material at one side and is removed from the solid absorber material on the opposite side. Thus two different vapor regions are provided for absorption and desorption of the coolant. The invention relates to the second structural type wherein the coolant is fed to the solid absorber material from a single vapor region to the middle of the depth of the chambers or chamberlike zones which contain the solid absorber material and travels back again. Thus, a single vapor region serves alternatingly as the absorber vapor region and the desorber vapor region. This second structural type has advantages, starting with the elimination of the second vapor region.

From the multitude of applicable prior art, the solid absorber according to U.S. Pat. No. 4,034,569 is cited as but one example.

For solid absorbers, the following different requirements should all be met at the same time, if possible, in the most optimum manner:

1. Mass transfer between coolant vapor and solid absorber material during the absorption process as well as during the desorption process should take place as unimpededly and quickly as possible and should cover the entire available mass of solid absorber material. This requires, inter alia, the least possible pressure loss along the vapor region as well as [only] small pressure differences between the surface of the solid absorber material facing the vapor region and regions disposed further back.
2. The flow, or current, of heat to the cooling heat exchange medium during the absorption phase as well as the transfer of heat from the heating heat exchange medium during the desorption phase are to take place as quickly and effectively as possible because heat losses, in particular, are undesirable, and large-area heat exchange surfaces lie as closely as possible to all regions of the solid absorber material, which itself generally is a relatively poor heat conductor.
3. Notwithstanding Requirements 1 and 2, the thermodynamic efficiency of the solid absorber is to be optimized at minimum expense for heat exchanger masses with reference to the given quantity of solid absorber material.
4. The design of the solid absorber is to make it possible to meet Requirements 1 through 3 equally well, independently of the dimensions of the solid absorber with respect to the solid absorber material.

The known solid absorbers of the second structural type considered by the invention meet these various requirements only in an imbalanced manner.

The species to which the invention relates is a refrigerator made by Homann-Werke, Wuppertal, as described in FIGS. 257 and 258 of the monograph by R. Plank/Kuprianoff, entitled "Die Kleinkältemaschine" [The Small Refrigeration Machine], published by Springer Verlag Berlin, Göttingen, Heidelberg, 2nd Revised Edition, 1960, pages 351–359, particularly beginning at page 355, No. 3. The system of calcium chloride and ammonia is used as the operating medium-coolant pair. The calcium chloride is filled into elongate vertical chambers whose upper frontal faces are open and which are formed of stamped and welded-together steel sheet. The ammonia vapor fills a vapor region composed of exposed frontal sections of the chambers. The surface area of the chamber system is enlarged considerably by welded-on ribs and is alternatingly charged with cooling air and with hot air heated by a burner system. Calcium chloride swells during the absorption of ammonia; therefore, the chambers can be filled only partially (see German Pat. No. 554,766, page 2, lines 62-70). The heat exchanger itself, which forms the chambers, has the shape of an upright plate whose large vertical dimension defines the depth of the chambers and whose large horizontal dimension width defines the direction in which the adjacent chambers follow and whose second, small horizontal dimension represents the length between the exterior surfaces that are charged with heat exchange medium. This length can only be small since otherwise the flow of heat from the exterior faces charged with the heat exchange medium through the exterior chamber walls into the solid absorber material would no longer be sufficient. Thus the above-mentioned Requirement 4 can no longer be realized, i.e. the prospect for unlimited expansion of the system in the direction of the above-mentioned (short)

length. System expansion is possible only in the width direction since expansion in the depth direction would also contradict the above Requirement 1. Moreover, the aspect of not permitting pressure losses through the vapor region which is part of this requirement is not met satisfactorily in this prior art arrangement since all of the separate vapor regions must be fed from one conduit system above the individual chambers which makes it difficult to prevent pressure losses along the length of the vapor region. If the chambers are excessively deep, moreover, undesirable additional pressure losses would occur in addiion to the insufficient mass transfer.

To obtain more compact structural units, it has been attempted, by way of various configurations, to give the heat exchanger a cylindrical shape. In solid absorbers of a different species, as disclosed in German Pat. No. 612,169 and German Pat. No. 814,158, which likewise goes back to the Homann-Werke, circular disc shaped or circular ring shaped metal supporting sheets were arranged vertically above one another. In this arrangement of a different species, in which no individual juxtaposed chambers are provided, the outer faces of the cylinder and possibly a cylindrical core recess are charged with the heat exchange medium. For the same reason as in the solid absorber of the species of the invention, the radial expanse of the heat exchanger, which corresponds to the length of the solid absorber of the species of the invention, is limited. Requirement 4 cannot be met as well since completely new heat exchangers with different radii have to be built if the solid volume is enlarged. Moreover, doubts continue to exist regarding the other mentioned criteria, particularly the pressure gradient.

In another known cylindrical configuration according to German Pat. No. 554,766—already mentioned in connection with the calcium chloride-ammonia system—wherein the cylinder axis is arranged horizontally, swelling solid absorber material is clamped in between a series of annular metal sheets. This clamped together assembly is introduced, with play to accommodate the increase in volume due to swelling, into a heat exchange body having laminar ribs on its exterior. The play volume simultaneously forms the vapor region. A centrally inserted resistance heating rod serves as the heating heat exchange medium, a stream of air charging the ribs on the cylindrical heat exchanger body serves as the cooling heat exchange medium. The predominant supply and removal of heat here takes place at the frontal faces of the chambers formed between the annular metal sheets. Heat transfer from the radially inwardly disposed frontal face is here inhibited in that this frontal face has the smallest surface area compared to the remaining outer chamber area. External cooling is thus impaired since heat conductive contact over the entire circumferential face of the chambers with the externally ribbed heat exchange body can be established only after the solid absorber material has swelled completely and then the heat conduction between the outer heat exchanger and the inner parts of the metal sheets is still impaired due to the poorly [heat] conducting solid absorber mass which lies therebetween, at least in a large circumferential region. Once the absorber material has swelled, the vapor region is also filled substantially by a porous mass, which does not return to its original volume, between the metal sheets and thus results in considerable pressure reductions in the vapor region.

All of the known solid absorbers considered above are relatively old. In the meantime, the stated drawbacks have resulted in stagnation of the applicable art. More recently, attempts have been made to again master these difficulties without, however, arriving at a convincing solution. The most recent state of the art is disclosed in DE-OS No. 3,016,290. Here, plate-shaped structural units, which may be connected in parallel in any desired way, are obtained in that solid granular absorber material, including zeolite, is tightly enclosed by a flexible metal or plastic sleeve so that an essentially rigid plate unit is formed. Each of these units accommodates within itself its own vapor region. An arrangement is preferred in which this vapor region extends in a central plane of the plate unit and two flat chambers are partitioned off at either side which, at the exterior faces of the plate unit, are charged by the heating or cooling heat exchange medium. For reasons of optimum heat contact with the heat exchange medium which charges the exterior of the plates, the respective chamber depth can be only very small since vapor regions and charging regions alternate with the heat exchange medium at both flat sides of the chambers and thus heat can flow into or out of the chamber only from one flat side. The narrow sides of the chambers can here be neglected. However, despite separation into individual structural units, this, involves relatively high construction costs per structural unit.

SUMMARY OF THE INVENTION

It is the object of the invention to find a new way for meeting the above-mentioned four requirements in the best possible way.

This is accomplished with a solid absorber apparatus of the described species, i.e., (1) discontinuous operation; and (2) single vapor region.

A solid absorber apparatus for a cyclic absorption process is provided and comprises a plurality of juxtaposed chambers which are separated from one another by partitions of a heat exchanger, are filled with solid absorber material, communicate at one of their frontal faces with a joint vapor region which is chargeable with coolant vapor, with the vapor regions being alternatingly connectable with an evaporator and a condenser of the cyclic absorption process and the chambers exchanging heat through the chamber walls alternatingly with a cooling and a heating heat exchange medium, characterized in that the partitions are designed as hollow conduits which themselves carry heat exchange medium and/or as heat conducting ribs of a ribbed heat exchanger which enters a secondary heat exchange with the heat exchange medium, such that the partitions take on at least the major portion of the heat flow between the solid absorber material of at least the chamber(s) disposed between adjacent chambers and the respective heat exchange medium.

In the solid absorber according to the invention, a differentiation is made initially between interior and exterior chambers. If desired, the exterior chambers may be provided with the same characteristics as the interior chambers without this being obligatory. The interior chambers are characteristic for the invention and may be present in any desired number so that at least three juxtaposed chambers are assumed to be provided within the scope of the invention.

If the number of interior chambers is multiplied, the configuration of the vapor region as a preferably continuous vapor region can be retained as well as the interconnection of the solid absorber.

For each individual interior chamber, the chamber depth can be set optimally to the desired period of mass transfer. Heat influx and discharge then take place at both sides of the chamber so that, without loss in heat intake or discharge, the chamber width can be selected twice as large as the plate thickness according to DE-OS No. 3,016,290. The length dimension here remains freely selectable, without impairing the characteristics [of the system] and can thus be adapted to the desired quantity of solid absorber without requiring an increase in the number of chambers for this purpose. It is therefore not even necessary to be able to fully utilize the chamber depth with respect to mass transfer since expansion possibilities exist in a different direction. The chamber depth can therefore be kept rather small so as to realize only a slight drop in pressure in the direction of the depth of the chamber.

The two alternative embodiments of the invention—which may also be coupled together as will be explained below in connection with a preferred embodiment—provide for either direct or indirect cooling or heating of the side walls of the interior chambers, i.e. of the partitions between juxtaposed chambers. Direct cooling is more intensive than indirect cooling. However, the greater structural expenditures for direct cooling can be compensated at least in part in that larger chamber widths can be used. In both alternative embodiments, the ratio of solid absorber mass to heat exchanger mass is favorable with respect to Requirement 3. Requirements 1 and 2 can be met in an optimum manner. Requirement 4 is met, at least in principle, by the free availability, on the one hand, of the width dimension (number of chambers) and, on the other hand, of the length dimension. It is possible without difficulty, if desired, to combine solid absorbers according to the invention in structural units and to connect them in parallel or also in series. However, it is then recommended to provide a large number of interior chambers so as to keep expenditures at a minimum for modifications of the exterior chambers. With the same effective characteristics, the width of one exterior chamber may either be selected at one-half the width of an interior chamber or the exposed side walls of the exterior chambers may be designed as heat exchange surfaces with direct or indirect cooling or heating, respectively, or measures oriented in both directions may be combined.

A structurally particularly simple embodiment of a solid absorber within direct cooling, i.e. with cooling by way of a not insignificant heat conductive intermediate path is characterized in that the ribbed heat exchanger is designed as a plate which is ribbed on both sides and wherein the ribs provided on one side form the partitions for the chambers, possibly including the outer walls of the externally disposed chambers, and the ribs provided on the other side, possibly together with the adjacent side of the plate, can be charged with heat exchange medium.

In the normal case, the ribs facing away from the chambers will be freely chargeable by, in particular, a gaseous heat exchange medium. In contradistinction thereto, an opportunity for conducting the heat exchange medium through at least one channel as well is provided wherein the ribbed heat exchanger may be designed as a plate having ribs on one side, with said ribs forming the partitions between the chambers, possibly inculding the outer walls of the externally disposed chambers, and that a channel or preferably a plurality of channels distributed over the plate is provided in the plate and/or in the heat conducting extensions thereof, said channel(s) being chargeable with heat exchange medium. This channel, in its simplest embodiment, may be a flow channel or other gas channel for a gaseous heat exchange medium for example, when the gaseous heat exchange medium is conducted in a gas channel along the ribs of the ribbed heat exchanger. The channel configuration is applicable, in particular, for liquid heat exchange media or even for the accommodation of a heat exchange medium in the form of a resistance heating element. It is then possible to combine the configuration of a ribbed heat exchanger with that of a channel forming heat exchanger, i.e., the channel or channels is (are) formed in a ribbed heat exchanger wherein ribs are provided at the plate with said ribs being chargeable with heat exchange medium, possibly together with the adjacent side of the plate.

It is not necessary—but of course possible—that each chamber have its own associated channel. Each channel may be associated with a plurality of chambers.

As already mentioned, the channels may serve to receive various types of heat exchange media, for example, at least one channel may accommodate a resistance heating element, or may be provided as a flow channel for a liquid or vaporous heat exchange medium. Channels may alternate with a resistance heating element and with being charged with a liquid or vaporous heat exchange medium, a particularity according to which alternating functions may be provided for successive channels, particularly so as to be able to alternatingly heat and cool successive channels.

Solar energy may also serve as the heating heat exchange medium, in which case the area receiving the heat must be designed in the manner of solar collectors.

If the solid absorber according to the invention is designed as a ribbed heat exchanger, it is preferably formed as an extruded profiled member, preferably of aluminum or an aluminum alloy. This means that it can be manufactured in a particularly simple manner.

In the case of direct cooling, a first preferred alternative provides that the partitions designed as hollow conduits are individual flat pipes, which flat pipes have only slightly rounded, rectangular cross-section. These flat pipes may constitute a borderline case of a bundled pipe heat exchanger wherein the pipes are combined into a pipe bundle heat exchanger by way of pipe bottoms. Primarily such individual flat pipes permit a structure similar to a ribbed heat exchanger so that it is possible to form block-shaped chambers as they are generally desired in connection with the invention. According to a second preferred alternative, the partitions in the from of hollow conduits are formed by pipes which are distributed along the respective partition. This is particularly easily realized structurally. The structurally simplest realization is obtained if round pipes are used. However, flat pipes can also be used, with the flat side advisably extending in the direction of the chamber depth. For example, oval pipes are applicable here. The pipes may here contact one another to form the partition; preferred, however, is a space between them so that the partitions separate the chambers between them only partially. The sides of the partitions not facing the chamber, i.e. the gaps between the pipes in particular, are then advisably covered or filled by a thin layer of the solid absorber material. The layer thickness may correspond to about one-half the distance b between the side walls of one chamber.

However, hollow conduits can also be realized in that chambers and channels are formed of a cross current plate heat exchanger.

The second structural type as improved according to the invention also makes it possible to permit each frontal face of the chambers to communicate with a vapor region. The difference between this and the first structural type is then that these two vapor regions communicate with one another so that the chamber, whose two frontal faces are each connected to a vapor region, practically constitutes a tandem arrangement of two chamber volumes each connected only to a single associated vapor region but arranged one behind the other. It is typical for this arrangement that the mass transfer interface travels in each case from the one vapor region to the middle of the depth of the chamber and back again while in solid absorbers of the first structural type this interface travels through the entire chamber from one vapor region to the other. Thus, in this tandem arrangement, the period of use of the apparatus which is defined by the travel of the mass transfer interface, refers only to half the depth of the chamber while in the first structural type it refers to the total depth.

Generally—as already mentioned with respect to the first structural type where the respective partition is constructed of a plurality of pipes—the side of the partition not facing the chamber is preferably covered by a thin layer of the solid absorber material. This makes it possible to keep the structural height of the partitions lower than the depth of the mass of solid absorber material without losing operational capability. On the other hand, the solid absorber mass disposed in this thin layer can be cooled or heated sufficiently from the frontal face of the partition. If such a thin layer is disposed on the side facing away from the vapor region and no further vapor region is provided there in a tandem arrangement, the solid absorber material can simultaneously serve as heat insulating means for the subsequent mechanical structure of the solid absorber. This requirement is optimally met when the layer thickness corresponds to about one-half the distance b between the side walls of one chamber.

The solid absorber according to the invention likewise makes it possible to fill the solid absorber material loosely into chambers that are open at the top. Then, however, limitations exist in the cyclic absorption process used in practice with respect to spatial orientation and during transport. A completely invariant spatial arrangement permits termination of the solid absorber material toward the vapor region by means of a grid network in which the side of the chambers facing the vapor region or the covering layer respectively, is covered by a vapor permeable grid network which holds down the solid absorber material, with the advantageous modification in which the grid network comprises a fine dust screen and a coarse supporting grid. Here, the function of holding down the unbroken granulate is performed by a coarse supporting grid and the blocking function against migration of solid absorber material that has become dust into the vapor region and connected conduits is performed by a dust screen which still permits the coolant vapor to pass, with the dust screen itself, which generally has a very low mechanical resistance, possibly being held down by the supporting grid.

To maintain the most identical pressure conditions possible in all chambers, the vapor region is preferably designed to be continuous with little choking so that essentially the same coolant vapor pressure exists in all chambers. This can be realized, in particular, by means of a relatively large volume continuous vapor region facing all chambers.

Several preferred structural configurations follow. Spacers may be distributed in the vapor region between the frontal faces of the chambers facing the vapor region and the wall of the vapor region, while possibly simultaneously supporting the solid absorber material which fills the chambers. The spacers may simultaneously hold down the grid network. The vapor region may be provided with a releasable cover. The spacers may be supported by the cover of by the grid network. The block form of the chambers is particularly desirable according to the invention and, to a certain degree, is accessible to modification without significantly weakening the principle of the effect of the invention. For example, it may be provided that the respective axis of at least the interior chambers is curved in the direction toward their depth. This can be realized in a particularly simple manner if partitions in the form of hollow walls are composed of a plurality of pipes, as previously discussed. Then these pipes which form a common partition may be arranged to be mutually offset. This can be done, for example, in that the pipes are arranged to be offset with respect to the gaps between them. The term "offset in their gaps" is here understood to mean an arrangement opposite the center of the gap as well as an only incomplete lateral displacement in the direction toward the gap. Preferred dimensions of a block-shaped chamber include: the depth h associated with one vapor region, in at least one interiorly disposed chamber is no more than 10 cm and the width b of said chamber is no more than 2 cm; the depth h of the chamber lies in a range from 2 to 6 cm, for extruded profiles preferably from 2 to 4 cm and for pipe bundle heat exchangers from 2 to 6 cm; and the chamber depth b lies in a range from 3 to 10 mm, preferably at about 6 mm. Preferred materials for operating means and coolants are a granulate, preferably zeolite solid absorber material, and water or ammonia as coolant. Preferred construction materials for the heat exchanger for the solid absorber according to the invention are those wherein at least the interiorly disposed chambers are formed of a ceramic material; a highly temperature resistant plastic, preferably a polyimide, polyamide or polyphenylene sulfide (PPS); corrosion resistant steel, e.g. V2A, V4A or a CuNiFe alloy; or Al, Cu or an alloy thereof.

BRIEF DESCRIPTION OF THE DRAWING

The invention will be explained in even greater detail below with the aid of schematic illustrations of several embodiments.

It is shown in:

FIG. 2 to FIG. 7, alternative embodiments of the solid absorber with the housing indicated only schematically, wherein:

FIG. 2, shows a solid absorber with ribbed heat exchanger which is modified by the additional arrangement of channels;

FIG. 3, a solid absorber in a housing provided with a combined double row of chambers and conduction of the heat exchange medium only through channels;

FIG. 4, a solid absorber provided with a bundled flat pipe heat exchanger;

FIG. 5, a solid absorber in which the heat exchanger according to FIG. 4 is modified and each frontal face is connected to a vapor region;

FIG. 6, a solid absorber in which the heat exchanger of FIG. 2 is doubled and which is provided with a common vapor region; and FIG. 7, a solid absorber in which the heat exchanger according to FIG. 4 is doubled and which is provided with a common vapor region; and wherein the sectional view in FIGS. 2 through 7 corresponds to that of FIG. 1;

FIG. 9, to FIG. 12, four modifications of FIG. 4, wherein the flat pipe forming a partition between adjacent chambers is replaced by several pipes extending along the partition, namely in a straight line according to FIGS. 9 and 11 and with some of the pipes offset in their gaps in a curved line according to FIGS. 10 and 12, with each partition according to FIGS. 9 and 10 being formed by three pipes and each partition according to FIGS. 11 and 12 being formed by four pipes.

DETAILED DESCRIPTION OF THE INVENTION

Figure 1:
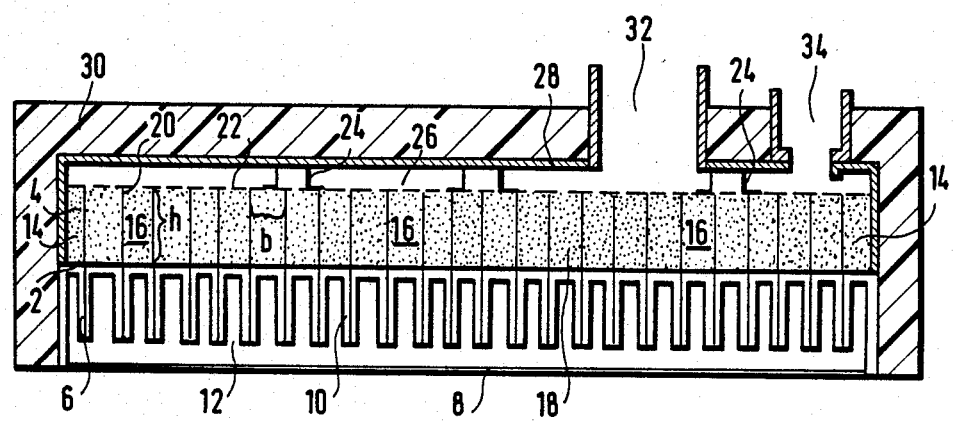
FIG. 1, a first embodiment of a solid absorber in the form of a ribbed heat exchanger in a cross-sectional view through a plane defined by the depth and width of the chambers while simultaneously showing the housing of the solid absorber which encloses the heat exchanger.

The solid absorber according to FIG. 1 includes, as its heat exchanger, a ribbed heat exchanger which is formed of an extruded profile. This heat exchanger comprises a central plate 2 having laminar ribs 4 and 6, respectively, formed at both its sides. Ribs 4 and ribs 6, respectively, are equidistant. For manufacturing reasons it is also of advantage for ribs 4 and 6 to face one another; however, functionally this is not absolutely necessary.

Plate 2 together with U-shaped profile 8 seated on top of it forms a rectangular chute into which project ribs 6 distributed along the chute and which serves as a gas channel or gas chimney 10 perpendicularly to the plane of the drawing. Through this channel, gaseous cooling and heating heat exchange medium can be conducted alternatingly; for example, alternatingly cooling air and combustion gases which are moved by a fan. To increase the heat transfer from the heat exchange medium to ribs 6, several comb-like turbulence sheets 12 are distributed over gas channel 10 parallel to the plane of the drawing and are fastened to the elongate, flat U-profile 8 while leaving a space with respect to ribs 6 and plate 2 so as to comb together, i.e., interdigitate, with ribs 6.

Ribs 4 between themselves subdivide block-shaped chambers, each having the same dimensions. This results in two side chambers 14 and chambers 16 having mutually identical dimensions and each having an adjacent chamber 14 or 16 at both sides. The chambers have a depth (or height) h, a width b and, perpendicularly to the plane of the drawing, a length l, which is indefinite and may be selected, in particular, to be rather long. The width of the two side chambers 14 is about b/2. Chambers 14 and 16 are filled with a granular or sausage shaped solid absorber material 18, zeolite in particular, which does not swell when it absorbs a coolant and is form stable overall. Moreover, the solid absorber material 18 forms a thin layer 20 which covers the free edges of ribs 4 and has a thickness of no more than b/2, here clearly a lesser thickness. The solid absorber material is held down in the direction toward chambers 14 and 16 by a grid network 22 which is shown merely schematically by a dashed line. This grid network 22 is comprsied of a fine dust screen, preferably of metal, and facing the chambers. This screen is impermeable to solid absorber dust, but permeable to coolant vapors and may be flexible. The solid absorber material 18 and the dust screen are held down by a coarse supporting grid. The supporting grid itself is supported by a plurality of local spacers 24 which are distributed over the length of the plate. These spacers may have the shape, for example, of a button, a column or, as shown, short U profiles having external bevels. It is important in this connection for the spacers 24 not to extend over the entire length of the chambers but to leave a continuous vapor region 26 at the side of the chamber facing away from plate 2. Spacers 24 themselves are supported at a cover 28 designed in the form of a flat rectangular cup which can be releasably attached to plate 2 opposite U profile 8. Instead of providing separate spacers 24, such spacers may also be made integral with cover 28, for example as deep drawn sections.

It is not absolutely necessary for cover 28 to be releasable once it has been fastened to plate 2, although this may be of advantage for filling in the solid absorber material and for performing any possibly required repairs. Since the filled-in solid absorber is actually very long lasting, the cover may also be fastened permanently, for example, welded to the ribbed heat exchanger.

At least over the area occupied by vapor region 26 and chambers 14 and 16, there further extends a heat damping bowl 30 which here also extends over the edge zones of gas channel 10 into the plane in the region of the back of the U profile.

Vapor region 26 has two pipe connections 32 and 34. Pipe connection 32 which has a somewhat larger inner cross section than pipe connection 34, is connectable with the evaporator (not shown) and pipe connection 34 is connectable with the condenser (not shown) of a periodically operating cyclic absorption process. Here condenser and evaporator are connected alternatingly to vapor region 26 while the respective other connection is blocked during the same time. The valves required for this purpose must be imagined to be provided additionally to connections 32 and 34.

Advisably, chambers 14 and 16, respectively, are not filled from the side of the later vapor region but in the direction of the width of the chambers with subsequent distribution in the direction of the length of the chambers. For this purpose, ribs 4 which serve individually as partitions for the chambers, may be cut back somewhat in this direction to thus provide a common fill area which can be supplied through a closable exterior fill pipe. This makes it possible to prefabricate the entire arrangement including the grid network and only then fill it with the solid absorber material.

Figure 2:
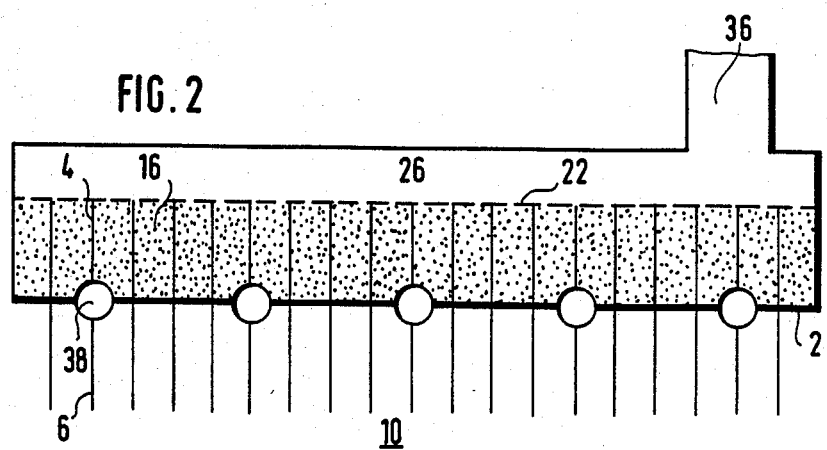

Instead of separate connections 32 and 34, a common conduit connection 36 may also be provided as this is shown in the embodiment of FIG. 2 without limiting the general scope [of the invention]. In this case, a two-way valve arrangement will be connected to pipeline connection 36 in the direction toward the evaporator and toward the condenser, and this arrangement is operated in the push-pull manner.

The basic structure of the solid absorber according to FIG. 2 is otherwise the same as that according to FIG. 1. Its particularity is merely that cylindrical channels 38 are formed in plate 2 where it intersects with ribs 4 and 6; these channels follow one another at the spacing of several chambers 16. In the illustrated embodiment, one channel 38 is associated with four chambers 16 or 14, respectively.

Such channels 38 can be utilized in different ways. On the one hand, they can accommodate the one type of heat exchange medium, for example the heating heat exchange medium, while ribs 6, as before, are charged with a stream of cooling air. However, ribs 6 can also be charged with a heating current and a cooling heat exchange medium can be conducted through channels 38. Finally, channels 38 can be used to reinforce the effect of a heat exchange medium acting on ribs 6, for example ribs 6 can be charged with a stream of heating air and additionally heat energy can be generated in channels 38 by a liquid heat exchange medium or by means of an installed resistance heating element. Finally, it is possible to have the type of heat charge alternate in the individual channels along plate 2 when seen in the direction of its width and to alternatingly connect the channels. And of course it is also possible to charge the same channel 38 alternatingly with different heat exchange media.

Figure 3:
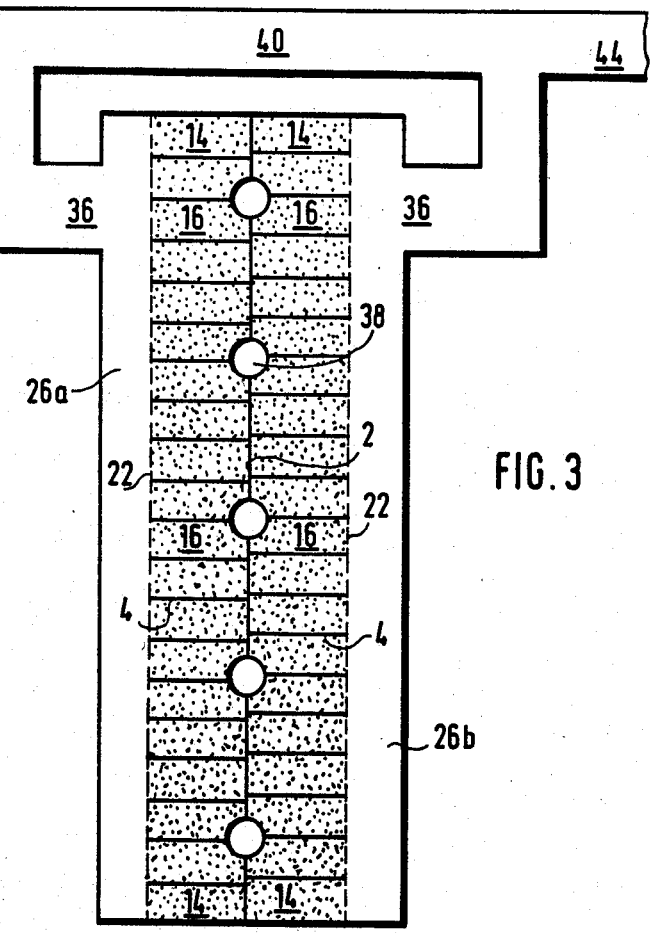

FIG. 3 shows a further modification of FIG. 2.

Here the secondary heat exchange ribs 6 are omitted entirely. Thus channels 38 alone are provided for charging with the cooling and heating heat exchange medium. In this case, the arrangement of alternating use of channels 38 is particularly preferred, so as to be able to avoid switching processes in the charging of individual channels.

On the other hand, this arrangement makes it possible to provide two rows of chambers 14 and 16 which are disposed at both sides of the common plate 2 and are each separated from one another by ribs 4 that serve as partitions.

To illustrate that these ribs need not be disposed opposite one another, they are drawn somewhat mutually offset. A corresponding offset with respect to ribs 4 and 6 is of course also possible in the other embodiments up to an offset of one-half.

The vapor region is here formed by two separate partial vapor regions 26a and 26b, which communicate with one another practically without pressure loss through a connecting conduit 40. The connecting conduit 40 is connected, via respective connections 36, with vapor regions 26a and 26b, respectively, and can be connected through corresponding valve devices and via continuing conduit sections 42 and 44, with the evaporator and condenser, respectively, of the absorption cycle. Externally, connections 42 and 44 take over the function of connections 32 and 34.

Figure 6:
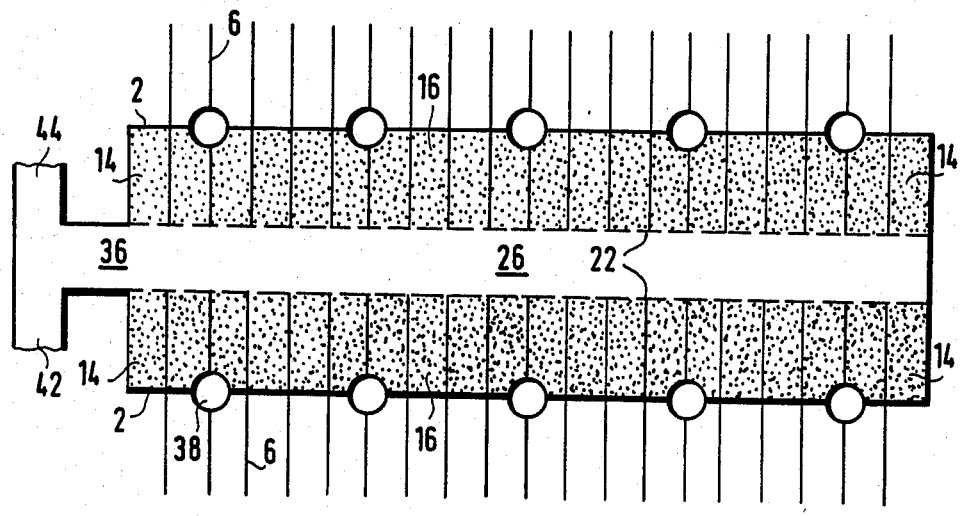

If channels 38 are not to be relied on to provide all of the heat transfer, as is the case in the arrangement according to FIG. 3, and ribs charged by a heat exchange medium, such as ribs 6, are to be retained, two rows of chambers 14 and 16 including a heat exchanger of the type shown in FIG. 2 can be interconnected as shown in FIG. 6. The same arrangement may also be provided by connecting together heat exchangers according to FIG. 1. It is notable in this connection, that the frontal faces of the respective chambers 14 and 16 of the two rows facing away from plates 2 are connected to a common vapor region 26 which again may be selectively connected, via a conduit connection 36, alternatingly to an evaporator and a condenser of the absorber cycle, as indicated by the two reference numerals 42 and 44.

As an alternative which is not illustrated, ribs 6 of both ribbed heat exchangers could also be combined to form a gas channel 10 common to both heat exchangers and instead form two separate vapor regions 26a and 26b, which can be connected together in the manner of FIG. 3.

Figure 4:
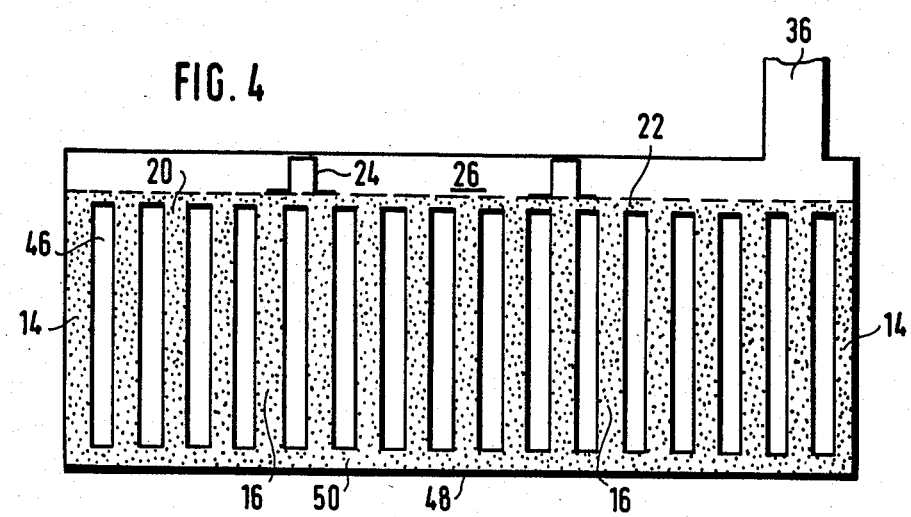
Figure 5:
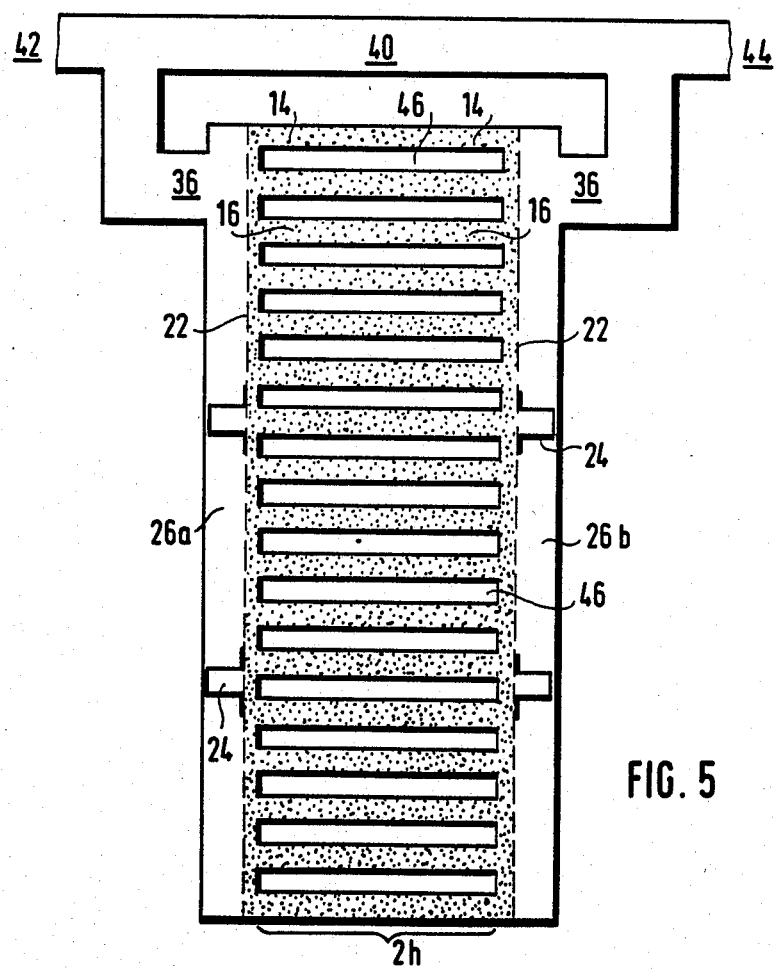
Figure 7:
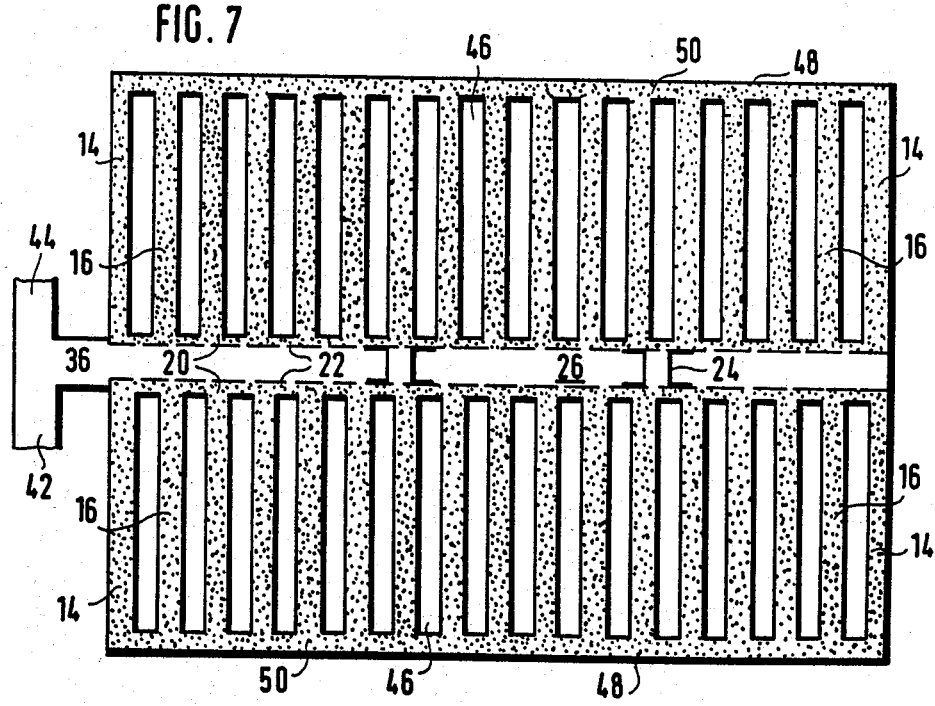

While FIGS. 1 to 3 and 6 relate to solid absorbers having ribbed heat exchangers, FIGS. 4, 5 and 7 relate to solid absorbers equipped with flat pipe bundle heat exchangers.

In this case, the outer chambers 14 and the inner chambers 16 are separated from one another by essentially elongate, rectangular flat pipes 46 which may be fed with heat exchange medium, preferably a heat exchange liquid, in a manner (not shown) customary for pipe bundle heat exchangers, through common pipe bottoms. Heat carrying oils, for example, can be used for this purpose.

In these embodiments, a plate 2 is no longer required, nor ribbed connections with ribs 6 for indirect heat transfer. In principle, however, the ribbed heat exchangers according to FIGS. 1 through 3 and 6 could be modified in such a manner that flat pipes 46 would take the place of ribs 4, if a combined heating and cooling effect were again desired to take place, for example, directly and indirectly at the same time. However, this possible combination will not be considered in any more detail below.

In the embodiment according to FIG. 4, the part surrounding vapor region 26 remains of the housing of the solid absorber according to FIG. 1 and may be supplemented by a basic housing member 48. Moreover, this applies correspondingly also to the arrangement according to FIG. 3.

In addition to the thin layer 20 according to FIG. 1 and the grid network 22, a further thin layer 50 is provided here which is disposed between the free edges of flat pipes 46 remote from vapor region 26 and basic member 48 and again preferably has a thickness of approximately or at most one-half the width b of the chambers.

As in the case of FIG. 3, two-row arrangements of the type shown in FIG. 4 can also be connected together. However, since here a plate 2 is no longer required, the two chambers 14 and 16 of each row may be directly contiguous so that here, without change in function, two chambers having the total depth 2h follow one another and the thin layer 50 as well as basic member 48 become unnecessary.

Here again, however, the combination may also be reversed in that two rows of chambers 14 and 16 according to FIG. 4 now have a joint associated vapor region 26, as shown in FIG. 7. Functionally, the association corresponds to that of FIG. 6, although the arrangement is based on a different type of heat exchanger.

Figure 8:
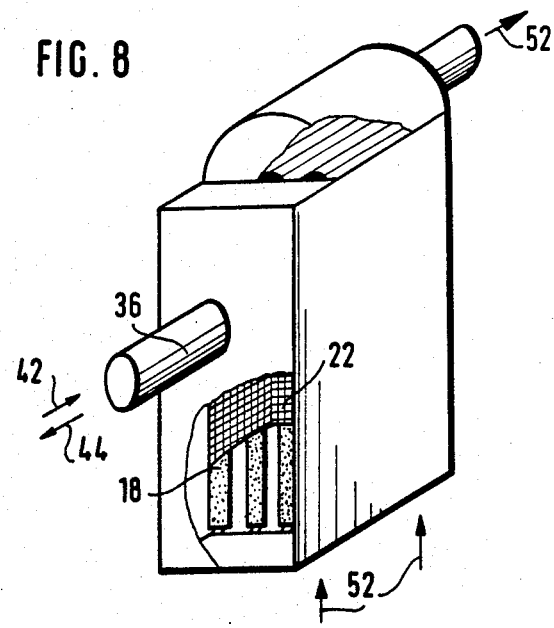
FIG. 8, a partially sectional perspective view of a solid absorber in which the heat exchanger is designed as a cross current plate heat exchanger.

Finally, according to FIG. 8, chambers for the solid absorber material of the solid absorber can be formed on the basis of a cross current plate heat exchanger. The channel system extending in one direction along the channels may here receive alternatingly the cooling or the heating heat exchange medium, as indicated by arrows 52. The spaces between the plates in the boxed alternative flow system are essentially filled with solid absorber material 18 and are delimited by means of grid network 22 against a vapor region which is connected with a conduit connection 36 and can be connected according to the oppositely directed arrows which correspond to connections 42 and 44, alternatingly with the evaporator, as indicated by the incoming arrow 42, or with the condenser, as indicated by the outgoing arrow 44. Instead of one vapor region, two separate partial vapor regions 26a, 26b may also be provided at both frontal faces of the filled system which are then connected together in the manner shown in FIGS. 3 and 5, inside or outside the housing by means of a connecting conduit 40.

In the structural design in which the partitions are formed as hollow conduits which themselves carry the heat exchange medium, a plurality of pipes 62 which, in groups, supplement one another to form a partition, can be used instead of the only slightly rounded individual rectangular flat pipes of the embodiment according to FIG. 4. This will be explained with the aid of the four alternative embodiments according to FIGS. 9 through 12.

The described embodiments are all to be understood within the scope of the remaining disclosure of this application and can be modified, if required.

Figure 11:
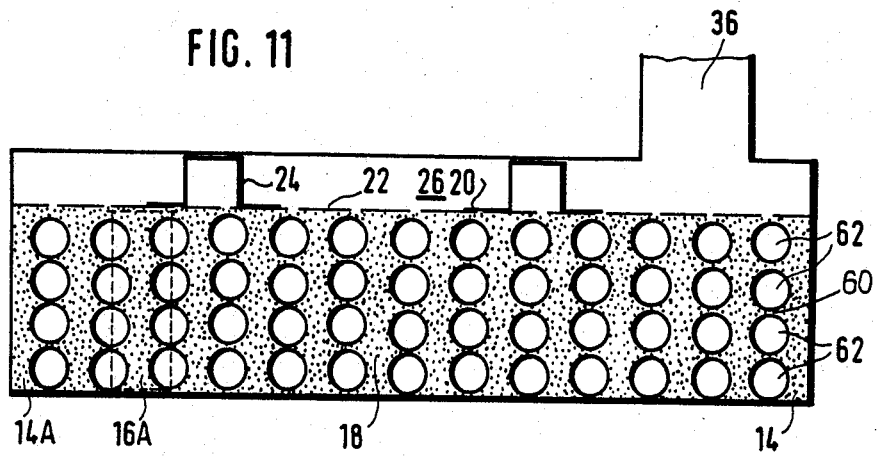
Figure 12:
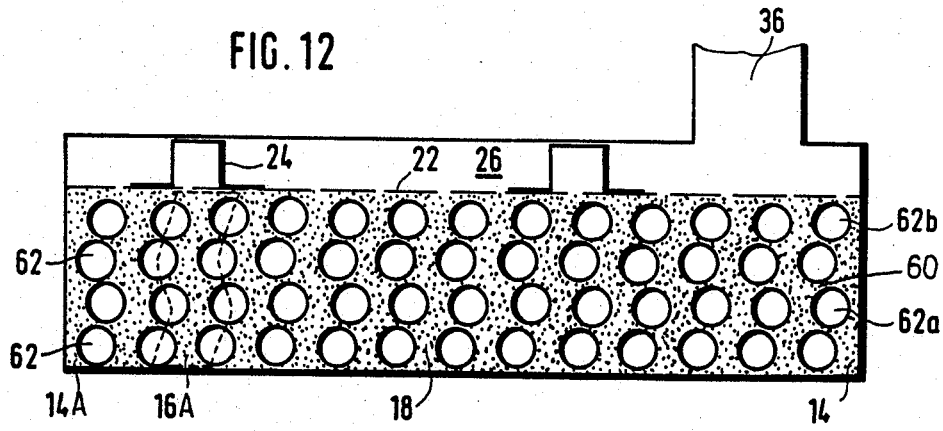

In the solid absorbers according to FIGS. 9 through 12, two exterior chambers 14 and a plurality of interior chambers 16, at least, however, one interior chamber, are arranged next to one another in a row and are separated by partitions which, in the case of FIGS. 9 and 10, are formed by three round pipes 62 and in the case of FIGS. 11 and 12 by four round pipes 62. They each replace a single flat pipe 46 according to FIG. 4. A heat exchange fluid flows through round pipes 62 whose ends leading out of the plane of the drawing are combined with respect to flow in the customary manner, e.g. by means of conventional pipe bottoms.

Chambers 14 and 16 are filled with solid absorber material 18, e.g. granular zeolite. This solid absorber material 18 extends from a horizontal basic member 48 of solid absorber to the oppositely disposed planar interface at a vapor region 26 charged with coolant vapor and connected via a conduit connection 36 to the cyclic absorption process.

Spacers 24 are fastened to a grid network 22 which serves to hold down the solid absorber material 18 and extends along the interface of the solid absorber material 18 facing the vapor region. The spacers are supported on the side of the absorber housing facing away from the solid absorber material 18, which side may be formed, for example, analogously to basic member 48 or, for example as in other embodiments, may be a cover. As described above, the grid network 22 may be composed of a fine dust screen facing the chambers and a coarse supporting grid facing the vapor region, with the coarse supporting grid being advisably connected with the spacers. The dust screen may also be fastened to the supporting grid; however, it is sufficient to stretch it loosely between the supporting grid and the solid absorber material.

A continuous thin layer 50 of solid absorber material 18 extends over basic member 48. Likewise, a continuous thin layer 20 of solid absorber material 18 extends below grid network 22. Along these two layers, which do not lie opposite the faces of the partitions between the chambers facing these chambers, the latter are partially in communication with one another. The same applies for the gaps 60 between pipes 62 of the same partition. Adjacent chambers also communicate with one another through these gaps which are filled with solid absorber material and are thus separated from one another only in part.

In an alternative arrangement, not shown but realized more likely in FIGS. 11 and 12 than in FIGS. 9 and 10, pipes 62 of each partition may also be brought together until they touch one another so that gaps 60 disappear.

In the illustrated embodiments of FIGS. 9 through 12, pipes 62 are round pipes. They could, however, be replaced by individual flat pipes, e.g. oval pipes, with the flat pipes advisably being arranged to have their larger diameter [oriented] in the direction of the respective partition.

In the embodiments according to FIGS. 9 and 11, three or four pipes 62, respectively, replace one flat pipe 46 of the arrangement of FIG. 4 and extend in a straight line in the direction of the depth of internal chamber-like zone 16A and also of external chamber-like zones 14A so that both types of chamber retain their essentially block shaped configuration.

The embodiment according to FIG. 10 differs from that of FIG. 9 in that the axes of the internal chamber-like zone 16A are curved in an arc in the depth direction of chamber-like zone 16A. For this purpose, the center pipes 62a of each partition are offset incompletely into the gaps with respect to pipes 62 of each partition which are aligned with one another in the depth direction of the chamber-like zone or with respect to the outer rows of pipes formed by pipes 62. An offset completely in the gaps, which is also possible but deviates from the illustration in FIG. 10, would mean that pipes 62a are spaced equidistantly from the most adjacent pipes 62 of that other two rows of pipes.

The embodiment according to FIG. 12 differs from that of FIG. 10 in that, in the arrangement of four round pipes 62 per partition in the pipe arrangement of FIG. 10, a pipe 62b follows the thin layer 20 ahead of pipes 62, with pipes 62b being disposed above pipes 62a. Likewise the two remaining pipes 62 of each partition are arranged above one another. In this way, the still approximately block-shaped configuration of internal chamber-like zones 16A is modified to a somewhat serpentine shape. Additionally, as in FIG. 11, the gaps 60 between the pipes have become smaller or, in the borderline case, have disappeared completely.

It is possible to provide only two pipes 62 or more than four pipes 64 per partition and to further modify the shape of the chamber-like zones, particularly that of interior chamber-like zones 16A.

It can also be seen that in all of FIGS. 9 through 12, pipes 62 (including 62a and 62b) are arranged in a regular grid pattern with the same distance between the rows parallel to vapor region 26 and the same distance between individual rows.

I claim:

1. A solid absorber apparatus for a discontinuously operable, cyclic absorption process of the type in which a coolant vapor is absorbed by a solid absorber material thereby releasing heat, which heat is removed by a cooling heat exchange medium and the absorber material is regenerated by adding heat by means of a heating heat exchange medium, during which regeneration the coolant is expelled, liquefied in a connected condenser and fed under reduced pressure to an evaporator from which the coolant can be returned, after evaporation, to the regenerated absorber material in a cyclic process, said solid absorber apparatus comprising:

a housing having a plurality of juxtaposed chamber-like zones provided therein, said zones extending longitudinally within said housing in one direction and in the same plane, each said zone having, in transverse cross-section, four sides;

a solid absorber means consisting essentially of a solid absorber material provided in said plurality of juxtaposed chamber-like zones;

heat exchange means disposed along at least a portion of each of at least two but less than four sides of each of said zones, whereby the zones are at least partially defined and separated from one another, and extending longitudinally within said housing, and adapted to carry alternatingly said cooling heat exchange medium and said heating heat exchange medium so that at least a major portion of the heat flow between the solid absorber material and the respective heat exchange medium takes place across said at least two but less than four sides of each of said zones; and a single vapor region defined within and extending longitudinally within said housing, said single vapor region being chargeable with said coolant vapor, being alternatively connectable with said condenser and said evaporator, and communicating jointly with the solid absorber material along the remaining side or sides of each of said zones, which remaining side or sides are open and communicate with said single vapor region, so that absorption and desorption of a given portion of coolant vapor takes place along the same side and through the same solid absorber material, the single vapor region thereby alternatingly serving as an absorber vapor region and a desorber vapor region, while coolant vapor pressure is essentially the same in all of said chamber-like zones, wherein the solid absorber material, heat exchange means, and single vapor region are longitudinally coextensive so that the capacity of the solid absorber apparatus may be increased by extending the apparatus in the longitudinal direction or in the transverse direction or both.

2. An apparatus according to claim 1, wherein the heat exchange means comprises a ribbed heat exchanger having a central plate and a plurality of heat conducting ribs extending perpendicularly from the central plate along at least one side thereof, said ribbed heat exchanger extending longitudinally within the housing, and wherein the plurality of juxtaposed chamber-like zones are a plurality of juxtaposed chambers having, in transverse cross-section, four sides and being separated from one another by the ribs of the ribbed heat exchanger, which separating ribs extend from one side of the central plate and define two opposing sides of each chamber, a portion of the central plate defining the third side of each chamber; and wherein the remaining side of each chamber is open and communicates with said single vapor region.

3. An apparatus according to claim 2, wherein the heat conducting ribs extend perpendicularly from both sides of the central plate and wherein the ribs extending from the side of the central plate opposite the sides from which the separating ribs extend, collectively define a heat exchange medium channel through which said cooling heat exchange medium and said heating heat exchange medium are alternatingly carried.

4. An apparatus according to claim 2, wherein the heat exchange means further comprises a plurality of channels provided along the central plate, extending longitudinally within the housing, and adapted to carry one of said cooling heat exchange medium and said heating heat exchange medium, while said heat exchange medium channel carries the other of said medium.

5. An apparatus according to claim 4, wherein at least one of said plurality of channels accommodates a resistance heating element instead of said heating heat exchange medium.

6. An apparatus according to claim 5, wherein the plurality of channels alternate, one channel being provided with a resistance heating element and an adjacent channel being charged with cooling heat exchange medium and so on.

7. An apparatus according to claim 2, wherein the heat exchange means comprises a pair of ribbed heat exchangers, said heat exchangers extending longitudinally within the housing and in parallel with one another; and wherein the respective open sides of the chambers face one another and communicate with said single vapor region.

8. An apparatus according to claim 7, wherein the ribs extending from the side of each central plate opposite the sides from which the separating ribs extend, collectively define a heat exchange medium channel through which said cooling heat exchange medium and said heating heat exchange medium are alternatingly carried.

9. An apparatus according to claim 7, wherein the heat exchange means further comprises a plurality of channels provided along each central plate, extending longitudinally within the housing, and adapted to carry one of said cooling heat exchange medium and said heating heat exchange medium, while said heat exchange medium channel carries the other of said medium.

10. An apparatus according to claim 9, wherein at least one of said plurality of channels in each central plate accommodates a resistance heating element instead of said heating heat exchange medium.

11. An apparatus according to claim 10, wherein the plurality of channels in each central plate alternate, one channel being provided with a resistance heating element and an adjacent channel being charged with cooling heat exchange medium and so on.

12. An apparatus according to claim 2, wherein a first set and a second set of said plurality of juxtaposed chambers are provided, one set on each side of the central plate;

wherein the heat conducting ribs extend from both sides of the central plate, the ribs on one side of the central plate separating the juxtaposed chambers of the first set and the ribs of the opposite side of the central plate separating the juxtaposed chambers of the second set;

wherein the heat exchange means further comprises a plurality of channels provided along the central plate, extending longitudinally within the housing, and adapted to carry alternatingly said cooling heat exchange medium and said heating heat exchange medium;

wherein the single vapor region includes a pair of partial vapor regions, one partial vapor region on each side of the central plate, each partial vapor region communicating with the solid absorber material through the open sides of the chambers adjacent one side of the central plate, respectively; and the solid absorber apparatus further comprising a connecting conduit in communication with both of said pair of partial vapor regions to thereby combine said pair of partial vapor regions into said single vapor region.

13. An apparatus according to claim 1, wherein the heat exchange means is disposed along each of two opposing sides of each of said zones and comprises a bundled flat pipe heat exchanger having a plurality of rectangular flat pipes, which flat pipes have, in transverse cross-section, a rectangular cross-section, are arranged parallel to one another and extend longitudinally within the housing, and a pair of common pipe bottoms interconnecting said flat pipes, one common pipe bottom positioned along each end of said plurality of flat pipes;

wherein the plurality of juxtaposed chamber-like zones are a plurality of juxtaposed chambers having, in tranverse cross-section, four sides and being separated from one another by the flat pipes, which flat pipes define two opposing sides of each chamber; and wherein one side of each chamber is open and communicates with said single vapor region.

14. An apparatus according to claim 13, wherein two opposing sides of each chamber are open and communicate with said single vapor region;

wherein the single vapor region further comprises a pair of partial vapor regions, each partial vapor region communicating with the solid absorber material through the open sides of one of the two opposing sides of each chamber, respectively; and wherein the solid absorber apparatus further comprises a connecting conduit for connecting said pair of partial vapor regions to form said single vapor region.

15. An apparatus according to claim 13, wherein a first set and a second set of said plurality of juxtaposed chambers are provided, one set on each side of the single vapor region;

wherein the heat exchange means comprises a pair of bundled flat pipe heat exchangers, said heat exchangers extending longitudinally within the housing and in parallel with one another; and wherein the respective open sides of the chambers face one another and communicate with said single vapor region.

16. An apparatus according to claim 1, wherein the heat exchange means is disposed along each of two opposing sides of each of said zones and comprises a bundled pipe heat exchanger having a plurality of pipes arranged, in transverse cross-section, in an array and extending longitudinally within the housing, and a pair of common pipe bottoms, one common pipe bottom positioned along each end of said plurality of pipes; and wherein two or more of said pipes are disposed along each of two opposing sides of each of said zones to thereby at least partially define said two opposing sides and separate said zones from one another.

17. An apparatus according to claim 16, wherein said two or more of said pipes disposed along each of two opposing sides of each of said zones have centers which, in transverse cross-section, are disposed along a straight line.

18. An apparatus according to claim 16, wherein said two or more of said pipes disposed along each of two opposing sides of each of said zones have centers which, in transverse cross-section, are offset and disposed along a serpentine-shaped line.

19. An apparatus according to claim 16, wherein said plurality of pipes are round pipes.

20. An apparatus according to claim 3, wherein said heat exchange medium is a gas and wherein the apparatus further comprises a plurality of turbulence sheets distributed at intervals within said heat exchange medium channel and extending in transverse planes and parallel to one another, said turbulence sheets having comb-like projections which interdigitate with the ribs defining the heat exchange medium channel whereby the heat transfer from the gas to the ribs is increased.

21. An apparatus according to claim 1, further comprising a thin layer of solid absorber material provided between the single vapor region and portions of the heat exchange means which would otherwise contact the single vapor region.

22. An apparatus according to claim 1, further comprising a thin layer of solid absorber material provided between the housing and portions of the heat exchange means proximate the housing.

23. An apparatus according to claim 21, wherein the thickness of the thin layer of solid absorber corresponds to about one-half the length of the open side or sides of said zones.

24. An apparatus according to claim 1, wherein said heat exchange means comprises a cross current plate heat exchanger.

25. An apparatus according to claim 1, further comprising a vapor permeable grid network positioned over the open sides of said zones through which the solid absorber material communicates with the single vapor region whereby the solid absorber material is held in place.

26. An apparatus according to claim 25, wherein the grid network comprises a fine dust screen and a coarse supporting grid.

27. An apparatus according to claim 1, wherein the solid absorber material has a constant volume.

28. An apparatus according to claim 27, wherein the solid absorber material is zeolite.

29. An apparatus according to claim 28, wherein the coolant vapor is water.

30. An apparatus according to claim 28, wherein the coolant vapor is ammonia.

31. An apparatus according to claim 3, wherein at least one of the cooling heat exchange medium and the heating heat exchange medium is a gas.

32. An apparatus according to claim 4, wherein at least one of the cooling heat exchange medium and the heating heat exchange medium, which is carried by at least one of the plurality of channels, is a liquid or a gas.

33. An apparatus according to claim 3, wherein the heat exchange medium channel is a gas channel.

34. An apparatus according to claim 2, wherein the ribbed heat exchanger is an extrusion molded profile and is comprised of aluminum or aluminum alloy.

35. An apparatus according to claim 1, wherein the single vapor region has a wall which faces the open sides of the chamber-like zones and wherein the apparatus further comprises a plurality of spacers which are distributed within the single vapor region and extend from the wall of the single vapor region to the solid absorber material along the open sides of the chamber-like zones.

36. An apparatus according to claim 25, wherein the single vapor region has a wall which faces the open sides of the chamber-like zones and wherein the apparatus further comprises a plurality of spacers which are distributed within the single vapor region, extend from the wall of the single vapor region to the vapor permeable grid network, whereby the grid network is supported and held in place.

37. An apparatus according to claim 35, wherein the wall of the single vapor region comprises a releasable cover and the plurality of spacers are supported by the releasable cover.

38. An apparatus according to claim 1, wherein each chamber-like zone has a depth h which corresponds to the length of each of two opposing sides, which do not communicate with the single vapor region, of each of said zones and is no more than 10 cm, and wherein each chamber-like zone has a width b which corresponds to the distance between the two opposing sides and is no more than 2 cm.

39. An apparatus according to claim 38, wherein the depth h ranges from 2 to 6 cm.

40. An apparatus according to claim 38, wherein the width b ranges from 3 to 10 mm.

41. An apparatus according to claim 2, wherein the plurality of juxtaposed chambers are comprised of a ceramic material.

42. An apparatus according to claim 2, wherein the plurality of juxtaposed chambers are comprised of a highly temperature resistant plastic selected from the group consisting of a polyimide, a polyamide and a polyphenylene sulfide.

43. An apparatus according to claim 2, wherein the plurality of juxtaposed chambers are comprised of a corrosion resistant steel selected from the group consisting of a V2A steel, a V4A steel and a CuNiFe alloy.

44. An apparatus according to claim 2, wherein the plurality of juxtaposed chambers is comprised of a metallic material selected from the group consisting of aluminum, copper and alloys thereof.

* * * * *